(12) United States Patent
Gutierrez (10) Patent No.: US 12,169,430 B2
(45) Date of Patent: Dec. 17, 2024

(54) REDUCING SYSTEM POWER CONSUMPTION WHEN CAPTURING DATA FROM A USB DEVICE

(71) Applicant: Advanced Micro Devices, Inc., Santa Clara, CA (US)

(72) Inventor: Raul Gutierrez, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 84 days.

(21) Appl. No.: 17/824,844

(22) Filed: May 25, 2022

(65) Prior Publication Data

US 2023/0384855 A1 Nov. 30, 2023

(51) Int. Cl.
*G06F 1/3234* (2019.01)
*G06F 13/10* (2006.01)

(52) U.S. Cl.
CPC .......... *G06F 1/3278* (2013.01); *G06F 13/102* (2013.01)

(58) Field of Classification Search
CPC .............................. G06F 1/3278; G06F 13/102
USPC ....................................................... 713/320
See application file for complete search history.

(56) References Cited

U.S. PATENT DOCUMENTS

| | | | | |
|---|---|---|---|---|
| 3,702,462 A * | 11/1972 | England | ..................... | G06F 1/18 710/1 |
| 4,138,719 A * | 2/1979 | Swanstrom | ........... | G06F 40/103 358/1.18 |
| 5,361,372 A * | 11/1994 | Rege | ........................ | H04L 49/90 370/428 |
| 6,292,176 B1 * | 9/2001 | Reber | ....................... | G09G 3/20 345/685 |
| 2001/0007565 A1 * | 7/2001 | Weng | .................... | H04L 49/9063 370/429 |
| 2003/0041252 A1 * | 2/2003 | Fung | ...................... | G06F 21/602 712/40 |
| 2009/0327533 A1 * | 12/2009 | Kallam | .................... | G06F 13/28 710/110 |
| 2010/0153590 A1 * | 6/2010 | Hsin | ...................... | G06F 1/3278 710/22 |
| 2012/0204086 A1 * | 8/2012 | Stoner | ..................... | G06F 16/94 715/201 |
| 2012/0230348 A1 * | 9/2012 | Pannell | ................. | H04L 47/245 370/437 |
| 2013/0262538 A1 * | 10/2013 | Wegener | ................. | H03M 7/30 708/203 |
| 2013/0268689 A1 * | 10/2013 | Leucht-Roth | ......... | H04L 1/0079 709/232 |

(Continued)

*Primary Examiner* — Paul R. Myers
(74) *Attorney, Agent, or Firm* — Volpe Koenig (57) ABSTRACT

Systems and methods are disclosed for reducing power consumed by capturing data from an I/O device. Techniques disclosed include receiving descriptors, by a controller of an I/O host of a system, including information associated with respective data chunks to be captured from an I/O device buffer of the I/O device. Techniques disclosed further include capturing, based on the descriptors, the data chunks. The capturing comprises pulling the data chunks from the I/O device buffer at a pulling rate, where the data chunks are transferred to a local buffer of the I/O host, and pushing segments of the pulled data chunks from the local buffer, where each segment is transferred to a data buffer of the system after a respective target time that precedes a time at which the data chunks in the segment are to be processed by an application executing on the system.

20 Claims, 5 Drawing Sheets

(56) References Cited

U.S. PATENT DOCUMENTS

2016/0187958 A1\* 6/2016 Wang .................... G06F 1/3287
710/316
2017/0031823 A1\* 2/2017 Ross .................. G06F 12/0862

\* cited by examiner

REDUCING SYSTEM POWER CONSUMPTION WHEN CAPTURING DATA FROM A USB DEVICE

BACKGROUND

To reduce cost and size, small buffers are integrated into I/O devices—such as USB devices—and, thus, the rate in which data should be pulled out of these buffers is relatively high (e.g., 1 Mbytes every 0.125 milliseconds). Transferring data from an I/O device buffer to the system's memory at a high pulling rate results in accessing the memory at the same rate, leaving short durations of time during which system components that facilitate the transfer of the data into memory can enter a sleeping mode (or a lower power state) to reduce their power consumption. Techniques are required to maintain long periods of idleness in system components that are involved in capturing data from I/O devices.

BRIEF DESCRIPTION OF THE DRAWINGS

A more detailed understanding may be had from the following description, given by way of example in conjunction with the accompanying drawings wherein.

DETAILED DESCRIPTION

For purposes of illustration only, aspects of the present disclosure are described with respect to a USB device and a USB host, however, aspects disclosed herein are not so limited. The methods and systems described herein are applicable to other types of I/O devices and I/O hosts.

There is a gap between the rate in which data should be pulled from a USB device and the rate in which an application consumes the pulled data. While a pulling rate is limited by the buffering capacity of a USB device, and, typically, cannot be changed, a consumption rate is determined by the application that processes the captured data. An application's required consumption rate is recorded by the application in descriptors. Each descriptor directs the capturing of a respective data chunk from the buffer of the USB device, including information such as whether an application should be notified (by an interrupt) about the completion of the transfer of that data chunk to memory. A USB controller carries out the capturing of data from the USB device according to those descriptors. In a case where the consumption rate is sufficiently lower than the required pulling rate, as disclosed herein, a USB controller can hold back (in a local buffer) data chunks that were pulled from the USB device buffer and serve them to the application only when their processing is required. That is, the pushing of such data chunks from the USB host local buffer to the system's data buffer can be delayed and can be performed during shorter time durations, thereby minimizing the time during which the system's memory is accessed. As a result, system components that facilitate the transfer of the data into memory can be placed in a sleeping mode during longer periods of time, and, thereby, consume less power.

Aspects of the present disclosure describe methods, performed by a controller of an I/O host of a system, for reducing power consumed by capturing data from an I/O device. The methods include receiving descriptors, including information associated with respective data chunks to be captured from an I/O device buffer of the I/O device and capturing, based on the descriptors, the data chunks. The capturing of the data chunks includes pulling the data chunks from the I/O device buffer at a pulling rate, where the data chunks are transferred to a local buffer of the I/O host. Then, pushing segments of the pulled data chunks from the local buffer, where each segment is transferred to a data buffer of the system after a respective target time. The respective target time precedes a time at which the data chunks in the transferred segment are to be processed by an application executing on the system.

Aspects of the present disclosure also describe an I/O host for reducing power consumed by capturing data from an I/O device. The I/O host includes a local buffer and a controller. The controller is configured to receive descriptors, including information associated with respective data chunks to be captured from an I/O device buffer of the I/O device and to capture, based on the descriptors, the data chunks. The capturing of the data chunks includes pulling the data chunks from the I/O device buffer at a pulling rate, where the data chunks are transferred to the local buffer. Then, pushing segments of the pulled data chunks from the local buffer, where each segment is transferred to a data buffer of the system after a respective target time. The respective target time precedes a time at which the data chunks in the transferred segment are to be processed by an application executing on the system.

Furthermore, aspects of the present disclosure describe a non-transitory computer-readable medium comprising instructions executable by at least one processor of a controller of an I/O host to perform a method for reducing power consumed by capturing data from an I/O device. The methods include receiving descriptors, including information associated with respective data chunks to be captured from an I/O device buffer of the I/O device and capturing, based on the descriptors, the data chunks. The capturing of the data chunks includes pulling the data chunks from the I/O device buffer at a pulling rate, where the data chunks are transferred to a local buffer of the I/O host. Then, pushing segments of the pulled data chunks from the local buffer, where each segment is transferred to a data buffer of the system after a respective target time. The respective target time precedes a time at which the data chunks in the transferred segment are to be processed by an application executing on the system.

Figure 1:
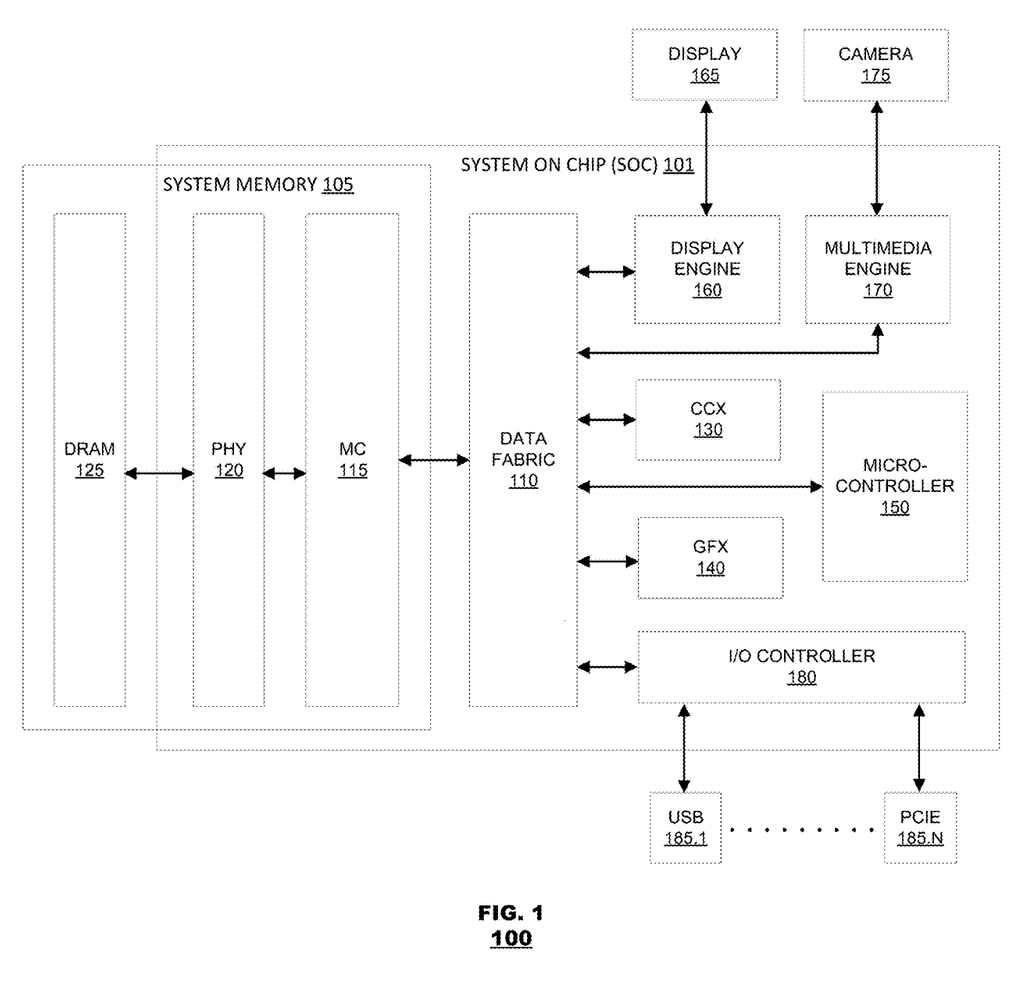
FIG. 1 is a block diagram of an example device 100, based on which one or more features of the disclosure can be implemented.

FIG. 1 is a block diagram of an example device 100, based on which one or more features of the disclosure can be implemented. The device 100 contains an SoC 101 that can include system components such as central processing units (CPUs) or cores, denoted as CCX 130, graphical processing units (GPUs), denoted as GFX 140, a microcontroller 150, a display engine 160, a multimedia engine 170, an Input/Output (I/O) controller 180, and other components (not shown). The CCX 130, controlled by an operating system (OS) executed thereon, is configured to run applications and drivers. The GFX 140 can be employed by those applications (via the drivers) to execute computational tasks, typically involving parallel computing on multidimensional data (e.g., graphical rendering and/or processing of image data). The microcontroller 150 is configured to perform system level operations—such as assessing system performance based on performance hardware counters, tracking the temperature of components of the SoC 101, and processing information from the OS. Based on data it gathers, for example, the microcontroller 150 manages the power allocation to the different components of the SoC. The SoC 101 further includes a data fabric 110, a memory controller (MC) 115, and a physical layer (PHY) 120 that provide access to memory, e.g., a DRAM unit 125. The data fabric 110 includes a network of switchers that interconnect the system components 130, 140, 150, 160, 170, 180 to each other and also provides the system components with read and write access to the DRAM units 125. The memory controller 115, the physical layer 120, and the DRAM unit 125 can be considered as parts of a system memory 105, and may each include multiple units of memory controllers, physical layers, and DRAM units, respectively, that may be connected to respective multiple units of data fabrics of the data fabric 110.

The device 100 of FIG. 1 can be a mobile computing device, such as a laptop. In such a case, I/O ports 185.1-N (or 185) of the device—including, for example, a universal serial bus (USB) port 185.1 and a peripheral component interconnect express (PCIE) port 185.N, among other I/O ports—can be serviced by the I/O controller 180 of the SoC 101. The display 165 of the device can be connected to the display engine 160 of the SoC 101. The display engine 160 can be configured to provide the display 165 with rendered content (e.g., generated by the GFX 140) or to capture content presented on the display 165 (e.g., to be stored in the DRAM 125 or to be delivered by the I/O controller 180 via one of the I/O ports 185 to a destination device or server). The camera 175 of the device can be connected to the multimedia engine 170. The multimedia engine 170 can be configured to process video captured by the camera 175, including encoding the captured video (e.g., to be stored in the DRAM 125 or to be delivered by the I/O controller 180 via one of the I/O ports 185 to a destination device or server).

The SoC 101 is typically powered by voltage rails that are supplied by a voltage regulator. For example, one voltage rail may be configured to supply power to the CCX 130 and the GFX 140 components, while another voltage rail may be configured to supply power to other components of the SoC. Generally, the voltage rails supply the system components with a total power level that is limited (by design) to the TDP (Thermal Design Power). And, thus, power drawn by the system components, and the resulting respective performance levels, are coupled. In an aspect, the microcontroller 150 advantageously and dynamically budgets the power allocated to the system components based on current performance requirements (e.g., of executed workloads) and system operating conditions.

One way in which the microcontroller 150 can reduce the power consumed by the system components is by placing components that are not in full use (that is, the workloads they are currently executing do not require data processing in high bandwidth or responding at low latency) at lower power states, where they are supplied with lower voltage levels and set to operate at lower clock frequencies, thereby, consuming less power. Furthermore, when such components are not in use at all, they can be placed at the lowest power state—that is, a sleeping mode—further increasing the saving in power consumed by these components.

In particular, and as described in the present disclosure, a USB device (connected to the USB port 185.1) that streams data engages several system components, such as the I/O controller 180, the data fabric 110, the memory system 105, including the components that consume the delivered data (e.g., any of the cores 130 or any of the graphical processing units 140). Hence, during the transfer of data from a USB device to the memory 125, the components that are involved in this transfer (that is, components along the traffic path 180, 110, and 105) cannot be placed in a sleeping mode (or at a lower power state), and, thus, no saving in power may be made during that time. However, such components may be placed at a sleeping mode (or at a lower power state) during the time data are not transferred from the USB device. In aspects disclosed herein, the transfer of data from a USB device to the memory 125 is performed in a manner that allows placing components along the data traffic path in a sleeping mode for longer time durations, resulting in an increase in power saving.

As mentioned above, the transfer of data from a USB device has to be performed at a pulling rate, $R_p$, that is dictated by the USB device. For example, based on the size of a buffer in the USB device, a data chunk has to be removed from the USB device buffer every $T_p$ milliseconds (e.g., 1 Mbytes of data have to be transferred out from the buffer every 0.125 milliseconds). If the pulling rate is not respected, data in the USB device buffer may be lost. Hence, in a typical operation, as data chunks are transferred out from the USB device buffer to memory, the system memory 105 may be accessed every $T_p$ millisecond. On the other hand, an application that consumes the transferred data may select to process the data at a granularity of several data chunks. For example, an application that processes video data, typically, will require receiving a whole video frame before starting the processing of data associated with that frame. Therefore, the consumption periodicity, $T_c$, of such an application may be lower than the pulling periodicity, $T_p$, as it may require receiving 100 data chunks (e.g., the equivalent of a video frame) before starting the processing of these data chunks, for example. In such a case, the memory system is being accessed to store the captured data chunks at a periodicity of $T_p$ while the application requires to process these data chunks only at a periodicity of $T_c=100T_p$. In practice, the gap between $T_c$ and $T_p$ may be very high, for example, when the USB device buffer is relatively small (a common design choice) and when the captured data contain data streams of high bitrate (e.g., live video and audio). Techniques disclosed herein utilize this gap to reduce the time during which the memory is accessed, thus, maximizing the time during which the data traffic path (e.g., system components 180, 110, and 105) is idle, enabling their placement at a lower power state or in a sleeping mode to save power. The manner in which USB captured data are transferred from a USB device to memory and served to a system component and techniques for reducing power consumed by such a transfer are further described in reference to FIGS. 2-5.

Figure 2:
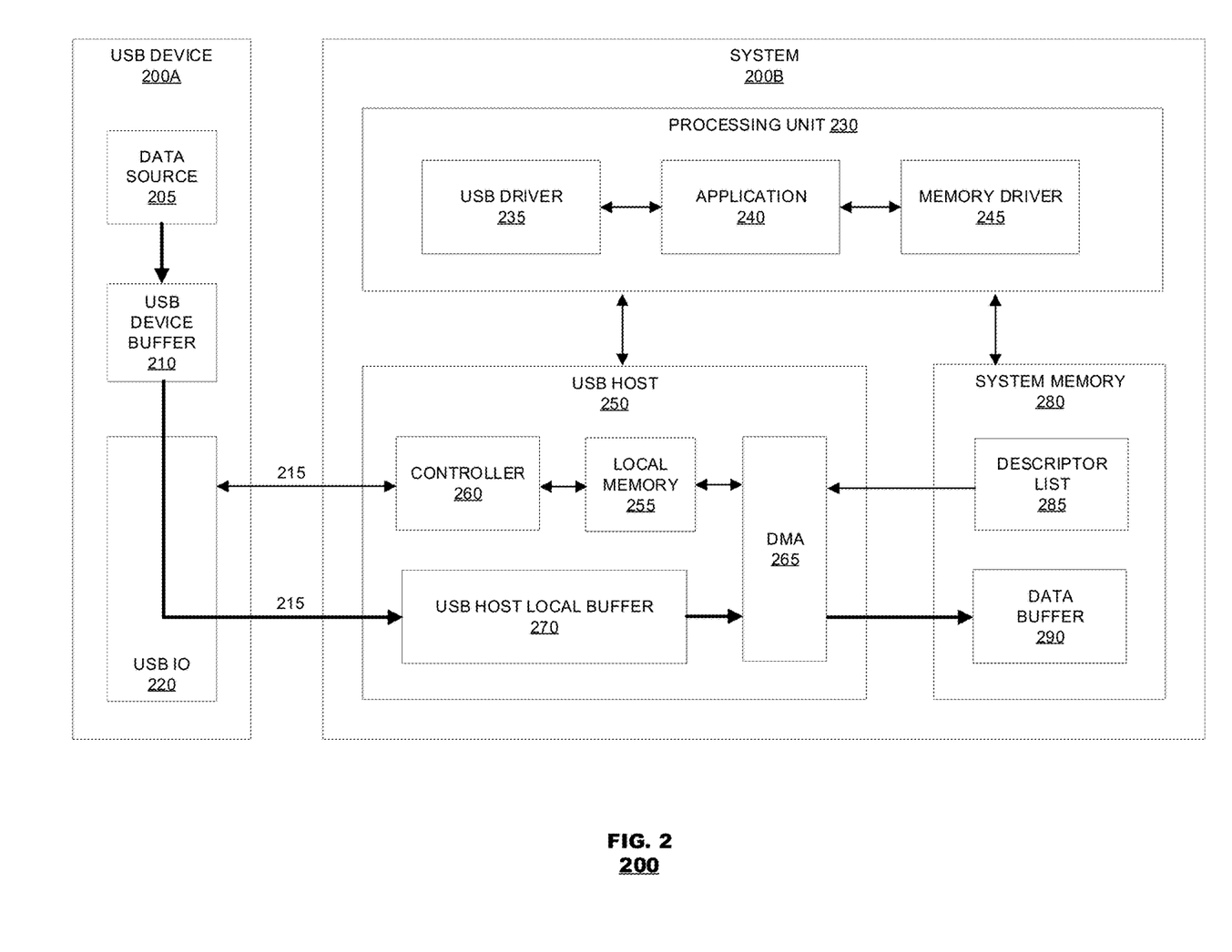
FIG. 2 is a block diagram of an example interface 200 between a USB device and a system, based on which one or more features of the disclosure can be implemented.

FIG. 2 is a block diagram of an example interface 200 between a USB device 200A and a system 200B, based on which one or more features of the disclosure can be implemented. The system 200B, for example, can be the SoC 101 that was described in reference to FIG. 1. As illustrated, the USB device 200A includes a USB device buffer 210 that is fed by one or more data streams provided by a data source 205. The data source 205 can be a video camera sensor, a microphone, or a network node that receives the data from another source, for example. The USB device 200A also includes a USB IO 220 through which data are transferred from the USB device buffer 210 to the system 200B. The system 200B is shown to have a system memory 280 (e.g., the system memory 105 of FIG. 1), including a descriptor list 285 and a data buffer 290 (e.g., both may be residing within the DRAM 125 of FIG. 1). The system 200B is shown to also have a USB host 250 which includes a controller 260, a local memory 255, a USB host local buffer 270, and a direct memory access (DMA) component 265, through which data are exchanged with the system memory 280. The system 200B further includes a processing unit 230 (e.g., one of the system components 130-170 of FIG. 1) that executes an application (or a kernel) 240. Typically, such an application accesses the system memory 280 via a memory driver 245 and accesses the USB host 250 via a USB driver 235 (e.g., a USB software stack). The manner in which USB captured data are transferred from the USB device buffer 210 to the data buffer 290 is further described below.

A USB device buffer 210, by design, is limited in size. Therefore, and in accordance with a given pulling rate $R_p$, a certain amount of data should be pulled out from the buffer 210 periodically to preserve data integrity. For example, a data chunk of D bytes (e.g., D=1 Mbytes) should be transferred out from the USB device buffer 210 every $T_p$ millisecond (e.g., $T_p$=0.125 milliseconds), consisted with a given pulling rate of $R_p$=D/$T_p$ [bytes/milliseconds]. When a USB device 200A is plugged in to a USB port 185.1 it becomes communicatively connected to a USB host 250 via a USB protocol 215. The controller 260 of the USB host then prompts the USB driver 235, informing it that a USB device 200A is plugged in and available for access. In response, the USB driver 235 inquires via the controller 260 as to the nature of the USB device (e.g., whether it is a USB camera, a USB headset, a USB mouse, or a USB hard drive). For example, the USB driver 235 may instruct the controller 260 to fetch 215 information from the USB IO 220, based on the configuration of the USB device. For example, configuration information of a USB device (a USB video camera, for example) includes the required pulling rate $R_p$, that is, the rate in which data (e.g., video data) should be removed from the USB device buffer 210.

Once the USB device 200A is configured, the device is available for use by an application 240. For example, following the configuration of a USB video camera, as soon as the camera is turned on by an application (e.g., by the user of a videoconferencing application) the application will determine, based on the configured pulling rate $R_p$ for that USB video camera, the size of data chunks that should be transferred out of the USB device buffer at a periodicity $T_p$ and the memory addresses these data chunks should be stored at. As mentioned above, since the application may consume these data chunks at a lower rate $R_c$<$R_p$, the application may require the controller 260 to send the application an interrupt signal (informing the application of the availability of the captured data) only after the transferring of a number of data chunks (not after the transferring of each of the data chunks).

To control the transfer of USB captured data, an application 240 maintains a list of descriptors 285, a data structure that is stored in the memory system 280 and is accessible to the controller 260 via the DMA 265. A descriptor list 285, L, can contain N work items $W_{i=1:N}$ for the controller 260 to process—that is, L={$W_1$, $W_2$ ..., $W_N$}. In an aspect, each descriptor $W_i$ in the list contains information such as: the size $D_i$ of a data chunk to transfer from the USB device buffer 210; to what address $A_i$ in the data buffer 290 to transfer that data chunk to; and an interrupt flag $I_i$, indicating whether at the end of the transfer of that data chunk an interrupt should be made to the USB driver 235—that is, $W_i$={$D_i$, $A_i$, $I_i$}.

Hence, to commence data transfer, the USB driver 235 rings a door bell associated with the controller 260, instructing the controller to carry out the transfer of data according to the information stored in the descriptor list L. In response, the controller 260 fetches the descriptor list 285 into its local memory 255 via the DMA 265 and processes them. That is, based on information in each descriptor $W_i$, the controller 260 drives the transfer request of a data chunk of size $D_i$ from the USB device buffer 210, through a USB host local buffer 270 and via the DMA 265 to address $A_i$ in the data buffer 290. After such a transfer, if so indicated (that is, if the $I_i$ flag is on) the controller sends an interrupt signal to the USB driver 235, informing the application 240 that the transfer of one or more data chunks has been completed. For example, the following descriptor list may be provided: L={{$D_1$, $A_1$, 0}, {$D_2$, $A_2$, 1}, {$D_3$, $A_3$, 0}, {$D_4$, $A_4$, 1}, . . . }, directing the controller 260 to issue an interrupt every other transfer of data chunk of size $D_i$ to address $A_i$. Thus, the controller can delay the transfer of data chunks, associated with descriptors $W_1$ and $W_3$, to the data buffer 290. Through the descriptors 285, an application can determine how often it would like to be interrupted, a feature that is utilized herein to increase the time the memory system 280 can be placed in a sleeping mode, as further described in reference to FIG. 3.

Figure 3:
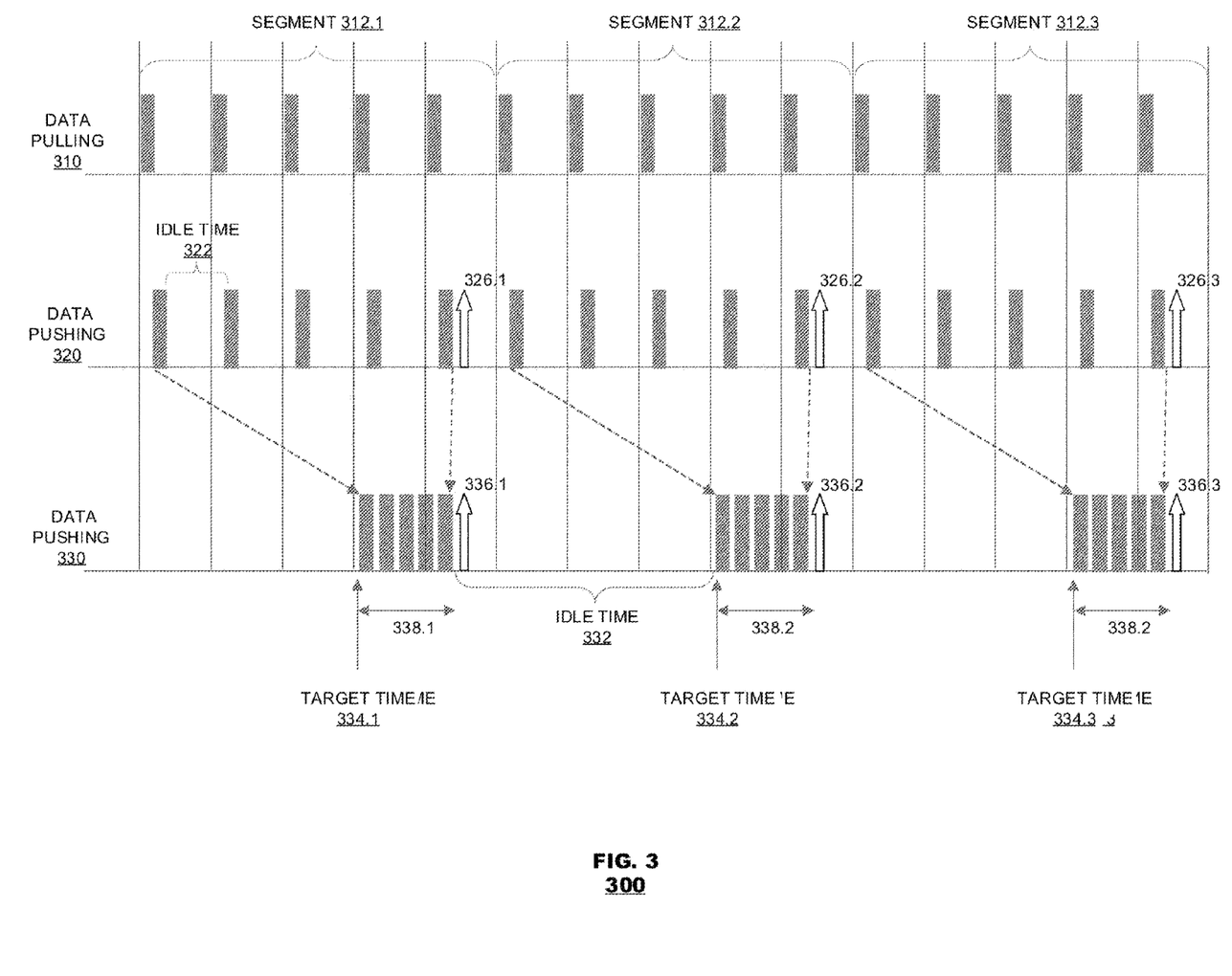
FIG. 3 is a diagram that illustrates pulling and pushing of data captured from a USB device, based on which one or more features of the disclosure can be implemented.

FIG. 3 is a diagram 300 that illustrates pulling and pushing of data captured from a USB device, based on which one or more features of the disclosure can be implemented. As mentioned above, in accordance with instructions prescribed by an application 240 in the descriptor list 285, the controller 260 carries out the capturing of data from the USB device buffer 210, transferring the data to the data buffer 290, and informing the application once data are ready for consumption. FIG. 3 demonstrates a data pulling process 310, where data chunks 312 are pulled by the controller from the USB device buffer 210 to the USB host local buffer 270 and a data pushing process 320, 330, where the pulled data chunks are pushed by the controller 260 from the USB host local buffer 270 to the data buffer 290, according to two examples.

Accordingly, in a pulling process 310, the controller pulls USB data at the configured pulling data rate, transferring out of the USB device buffer 210 data chunks 312 at an $R_p$ rate—that is, one data chunk is removed from the USB device buffer 210 every $T_p$ milliseconds and is transferred into the USB host local buffer 270. Concurrently, in a first example of a pushing process 320, the controller pushes the data chunks that were accumulated in the USB host local buffer 270 into the data buffer 290. In doing so, the memory system 280 is accessed every time a data chunk is stored in memory, resulting in a short idle time 322 between these memory accesses. However, in this example, in accordance with the descriptors 285, the controller generates interrupts 326.1-3 only after pushing five data chunks, which means that the pushing of these five data chunks can be delayed, as demonstrated next in a second example of the pushing process 330.

Hence, in a second example of the pushing process 330, the controller 260 delays pushing the data chunks to a target time that is before the due time of the next interrupt. Thus, as demonstrated, instead of pushing the first segment 312.1 of five data chunks every $T_p$ milliseconds, their pushing begins at a target time 334.1 that is before the following interrupt 336.1. Similarly, instead of pushing the second segment 312.2 of five data chunks every $T_p$ milliseconds, their pushing begins at a target time 334.2 that is before the following interrupt 336.2, and so on. Delaying the pushing of data chunks into the data buffer 290 affords a longer idle time 332 during which the memory system 280 is not used. Moreover, all the system components that are engaged in this transfer of data 330 (that is, components along the traffic path 180, 110, and 105), if not used by other system components, can be placed in a sleeping mode during that idle time 332. Note that, when the number of data chunks in a segment 312 is large, the idle time 332 in the second example 330 may be significantly longer than the idle time 322 in the first example 320. The pulling process 310 and the pushing process 330 of data captured from a USB device are further described in reference to FIG. 4 and FIG. 5.

Figure 4:
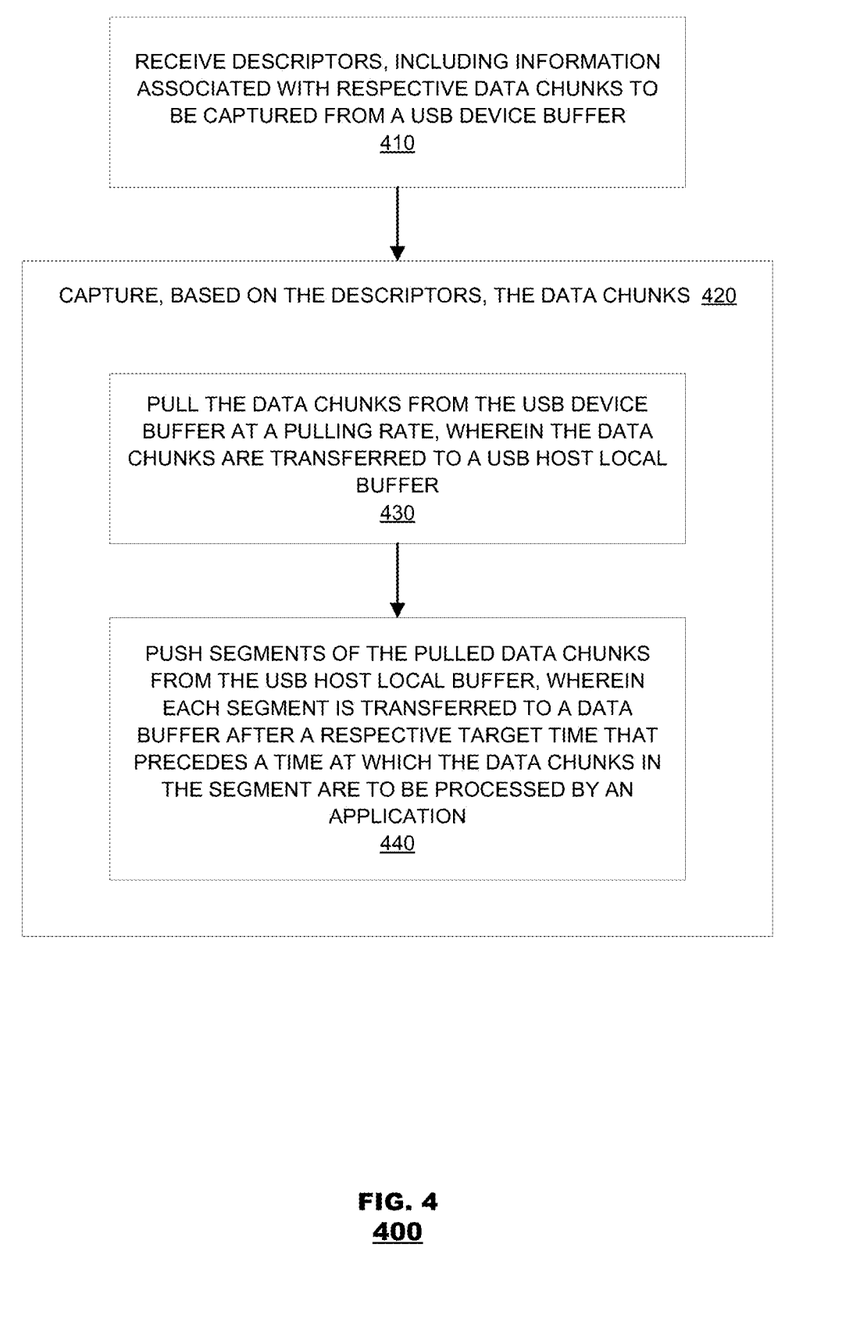
FIG. 4 is a flowchart of an example method for reducing power consumed by capturing data from a USB device, based on which one or more features of the disclosure can be implemented.

FIG. 4 is a flowchart of an example method 400 for reducing power consumed by capturing data from a USB device, based on which one or more features of the disclosure can be implemented. Method 400 may be employed by the controller 260 of the USB host 250 of the system 200B. The method 400 begins, in step 410, by receiving descriptors, determined by an application executing on the system. These descriptors include information associated with respective data chunks to be captured from the USB device buffer 210 of the USB device 200A. For example, a descriptor can include the size of a respective data chunk and an address in the data buffer 290 to transfer the respective data chunk to, as well as an interrupt flag, indicative whether an interrupt should be issued following the capturing of a respective data chunk. Based on the descriptors, data chunks are captured 420 from the USB device 200A. The capturing is performed by steps 430 and 440 as follows. In step 430, the data chunks are pulled from the USB device buffer at a given pulling rate, where the data chunks are transferred to the USB host local buffer 270 of the USB host 250. Then, in step 440, segments of the pulled data chunks are pushed from the USB host local buffer, where each segment is transferred to the data buffer 290 of the system 200B after a respective target time that precedes a time at which the data chunks in the segment are to be processed by the application. The respective target time can be computed based on the pulling rate, the size of data chunks in a respective segment (as defined by respective descriptors), the throughput of the USB host local buffer 270, or a combination thereof. A more detailed example for the pulling and the pushing of data captured from a USB device is next described in reference to FIG. 5.

Figure 5:
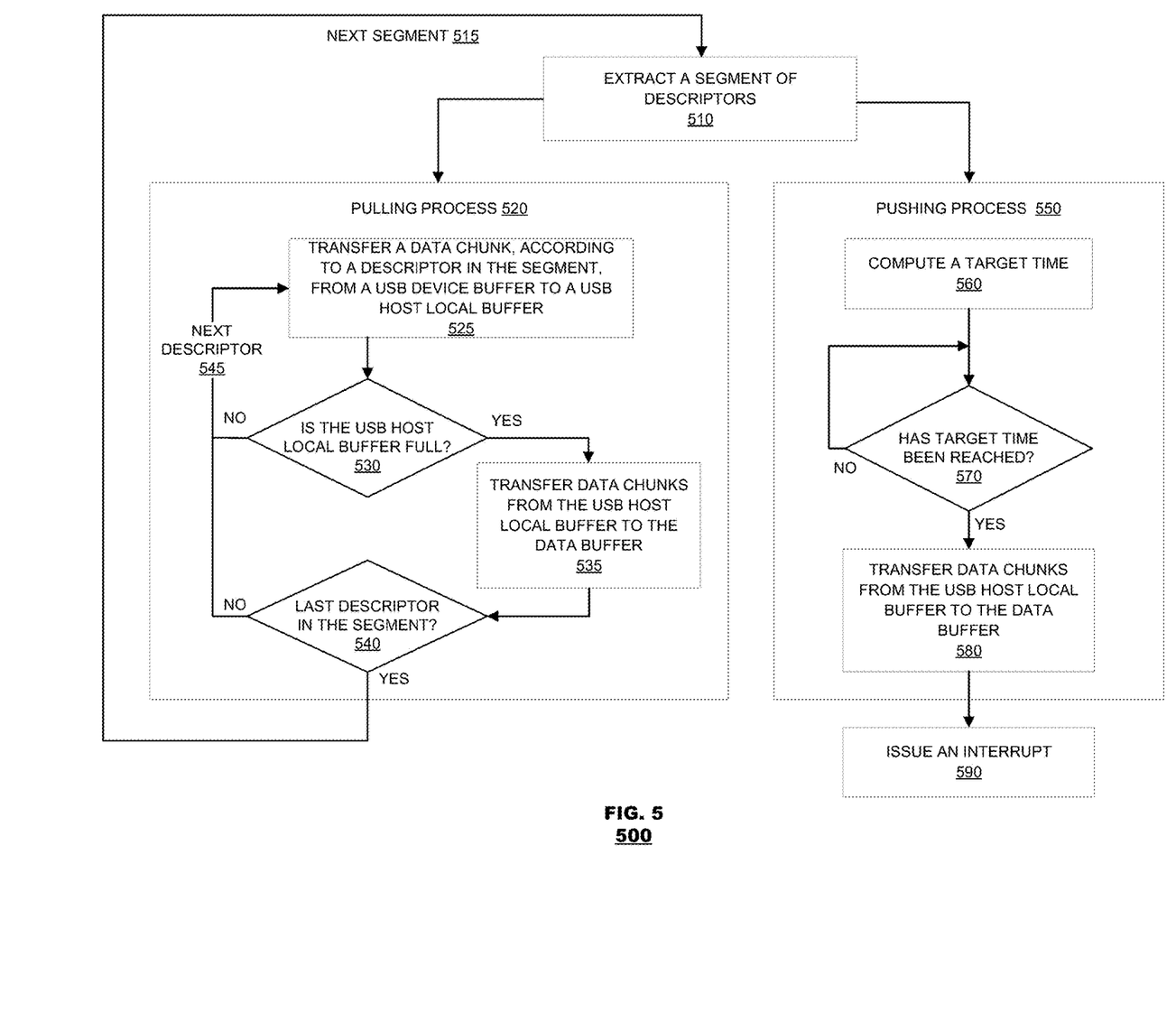
FIG. 5 is a flowchart of an example method for pulling and pushing of data captured from a USB device, based on which one or more features of the disclosure can be implemented.

FIG. 5 is a flowchart of an example method 500 for pulling and pushing data captured from a USB device, based on which one or more features of the disclosure can be implemented. As mentioned above, through descriptors 285 an application 240 (via a USB driver 235) can direct a controller 260 of a USB host 250 how to serve the data provided from a USB device 200A to the application. Furthermore, the frequency in which an application requires to be informed of the availability of transferred data chunks in memory can be utilized to maximize the idle times 332 of the system components that facilitate the transfer of the data. Method 500 demonstrates operations, performed by the controller 260, of pulling and pushing data according to descriptors (that is, descriptors that are recorded in the descriptor list 285 and fetched into the local memory 255). The method 500 begins, in step 510, by extracting a segment of descriptors. That is, the controller extracts from the descriptor list a segment of consecutive descriptors that ends with a descriptor for which an interrupt is requested (the interrupt flag is on)—an example for a segment can be $L_{i=1-100} = \{\{D_1, A_1, 0\}, \{D_2, A_2, 0\}, \ldots, \{D_{100}, A_{100}, 1\}\}$. Based on the extracted segment, the method 500 initiates a pulling process 520, at the end of which the next descriptor segment 515 is extracted, and a pushing process 550, at the end of which an interrupt is issued 590, as further described below.

The pulling process 520 carries out the transfer of data chunks from the USB device buffer 210 to the USB host local buffer 270 at the given pulling rate, according to descriptors in the currently extracted segment. After the transfer of each data chunk, according to a descriptor in the segment, in step 525, the process checks to see whether the USB host local buffer is already full in step 530. If so, some or all the data chunks that were accumulated so far in this buffer 270 have to be transferred to the data buffer in step 535, before the transfer 525 of the rest of the data chunks in the segment may continue 545. The pulling process 520 ends when in step 540 it is found that all descriptors in the segment were processed. For example, given the segment $L_{i=1-100}$, the pulling process 520 transfers 100 data chunks to the USB host local buffer. If the USB host local buffer is not large enough to hold all the 100 data chunks, when filled it will have to be emptied before the pulling of the remaining data chunks can continue (step 535).

The pushing process 530 carries out the transfer of pulled data chunks from the USB host local buffer 270 to the data buffer 290. However, to maximize the time in which the memory system 280 can be idle 332, the transfer undertaken by the pushing process is delayed to a target time 334, as explained in reference to the second data pushing example 330 of FIG. 3. Accordingly, the pushing process 550 can begin, in step 560, by computing a target time 334 to which the transfer of data chunks accumulated in the USB host local buffer (by the pulling process 520) can be delayed. When that time has been reached 570, the transfer of the data chunks from the USB host local buffer to the data buffer can begin, in step 580. For example, given the segment $L_{i=1-100}$, the pushing process 550 transfers the 100 data chunks that have been accumulated in the USB host local buffer by the pulling process 520. In a case where some of these data chunks already have been transferred (in step 535), the remaining data chunks in the USB host local buffer are transferred in step 580. Once the pushing of all the data chunks associated with the current segment has been completed, an interrupt can be issued 590 by the controller 260, informing the application 240 that the data chunks associated with the current segment (e.g., $L_{i=1-100}$) are available in memory (e.g., at address $A_{i=1-100}$) to be processed by the application.

As mentioned above, a target time 334 to which the transfer (step 580) of data chunks can be delayed can be computed (step 560) with respect to each segment 312. As illustrated in FIG. 3, the time duration 338, that is extended between the computed target time 334 and the time an interrupt 336 is expected by the application, has to be long enough to allow for the transfer of the data chunks of each segment 312 from the USB host local buffer 270. In an aspect, the target time 334 is determined based on factors such as: the given pull rate $R_p$, the size of the pulled data chunks (in a segment 312 leading to an interrupt 336), and the throughput of the data bus that connects the USB host local buffer 270 and the data buffer 290. In an aspect, an application may change the required interrupt rate (specified in the descriptor list 285) over time. Consequently, the size of the segments 312 may vary with time and so too the required respective time durations 338, based on which respective target times 334 are computed.

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, or a processor core. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer or a processor or hardware finite state machines. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, performed by a controller of an I/O host of a system, for reducing power consumed by capturing data from an I/O device, comprising:
   receiving descriptors including size and timing information associated with each respective data chunk among data chunks to be captured; and
   capturing, based on the descriptors, the data chunks from an I/O device buffer of the I/O device, wherein the capturing comprises:
   pulling the data chunks from the I/O device buffer at a pulling rate, wherein the data chunks are transferred to a local buffer of the I/O host, and
   pushing segments of the pulled data chunks from the local buffer, wherein each segment is transferred to a data buffer of the system after a respective target time that precedes a time at which the data chunks in the segment are to be processed by an application executing on the system.

2. The method of claim 1, wherein the pushing of the segments of the pulled data chunks from the local buffer further comprises:
   computing the respective target time based on the pulling rate.

3. The method of claim 1, wherein the pushing of the segments of the pulled data chunks from the local buffer further comprises:
   computing the respective target time based on a size of data chunks in a respective segment of the segments.

4. The method of claim 1, wherein the pushing of the segments of the pulled data chunks from the local buffer further comprises:
   computing the respective target time based on a throughput of the local buffer.

5. The method of claim 1, wherein each of the descriptors includes an interrupt flag, indicative whether an interrupt should be issued following the transfer of a respective data chunk.

6. The method of claim 1, wherein each of the descriptors includes a size of a respective data chunk and an address in the data buffer to transfer the respective data chunk to.

7. The method of claim 1, wherein each of the segments corresponds to a segment of descriptors, wherein only the last descriptor in the segment of descriptors includes an interrupt flag that is on, indicative of the time at which the data chunks in the segment are to be processed by the application.

8. The method of claim 1, the pulling of the data chunks further comprises:
   transferring data chunks accumulated in the local buffer to the data buffer, responsive to the local buffer being full.

9. An I/O host for reducing power consumed by capturing data from an I/O device, comprising:
   a local buffer; and
   a controller, the controller is configured to:
   receive descriptors including size and timing information associated with each respective data chunk among data chunks to be captured, and
   capture, based on the descriptors, the data chunks from an I/O device buffer of the I/O device, wherein the capturing comprises:
   pulling the data chunks from the I/O device buffer at a pulling rate, wherein the data chunks are transferred to the local buffer, and
   pushing segments of the pulled data chunks from the local buffer, wherein each segment is transferred to a data buffer of a system after a respective target time that precedes a time at which the data chunks in the segment are to be processed by an application executing on the system.

10. The I/O host of claim 9, wherein the pushing of the segments of the pulled data chunks from the local buffer further comprises:
    computing the respective target time based on the pulling rate.

11. The I/O host of claim 9, wherein the pushing of the segments of the pulled data chunks from the local buffer further comprises:
    computing the respective target time based on a size of data chunks in a respective segment of the segments.

12. The I/O host of claim 9, wherein the pushing of the segments of the pulled data chunks from the local buffer further comprises:
    computing the respective target time based on a throughput of the local buffer.

13. The I/O host of claim 9, wherein each of the descriptors includes an interrupt flag, indicative whether an interrupt should be issued following the transfer of a respective data chunk.

14. The I/O host of claim 9, wherein each of the descriptors includes a size of a respective data chunk and an address in the data buffer to transfer the respective data chunk to.

15. The I/O host of claim 9, wherein each of the segments corresponds to a segment of descriptors, wherein only the last descriptor in the segment of descriptors includes an interrupt flag that is on, indicative of the time at which the data chunks in the segment are to be processed by the application.

16. The I/O host of claim 9, the pulling of the data chunks further comprises:

transferring data chunks accumulated in the local buffer to the data buffer, responsive to the local buffer being full.

17. A non-transitory computer-readable medium comprising instructions executable by at least one processor of a controller of an I/O host to perform a method for reducing power consumed by capturing data from an I/O device, the method comprising:

receiving descriptors including size and timing information associated with each respective data chunk among data chunks to be captured; and capturing, based on the descriptors, the data chunks from an I/O device buffer of the I/O device, wherein the capturing comprises:

pulling the data chunks from the I/O device buffer at a pulling rate, wherein the data chunks are transferred to a local buffer of the I/O host, and pushing segments of the pulled data chunks from the local buffer, wherein each segment is transferred to a data buffer of the system after a respective target time that precedes a time at which the data chunks in the segment are to be processed by an application executing on the system.

18. The non-transitory computer-readable medium of claim 17, wherein the pushing of the segments of the pulled data chunks from the local buffer further comprises:

computing the respective target time based on the pulling rate, a size of data chunks in a respective segment of the segments, a throughput of the local buffer, or a combination thereof.

19. The non-transitory computer-readable medium of claim 17, wherein each of the descriptors includes a size of a respective data chunk, an address in the data buffer to transfer the respective data chunk to, and an interrupt flag, indicative whether an interrupt should be issued following the transfer of a respective data chunk.

20. The non-transitory computer-readable medium of claim 17, wherein each of the segments corresponds to a segment of descriptors, wherein only the last descriptor in the segment of descriptors includes an interrupt flag that is on, indicative of the time at which the data chunks in the segment are to be processed by the application.

* * * * *